Dec. 26, 1922.
F. H. LIPPINCOTT.
DRIVING MECHANISM.
FILED AUG. 1, 1921.
1,440,161
2 SHEETS-SHEET 1
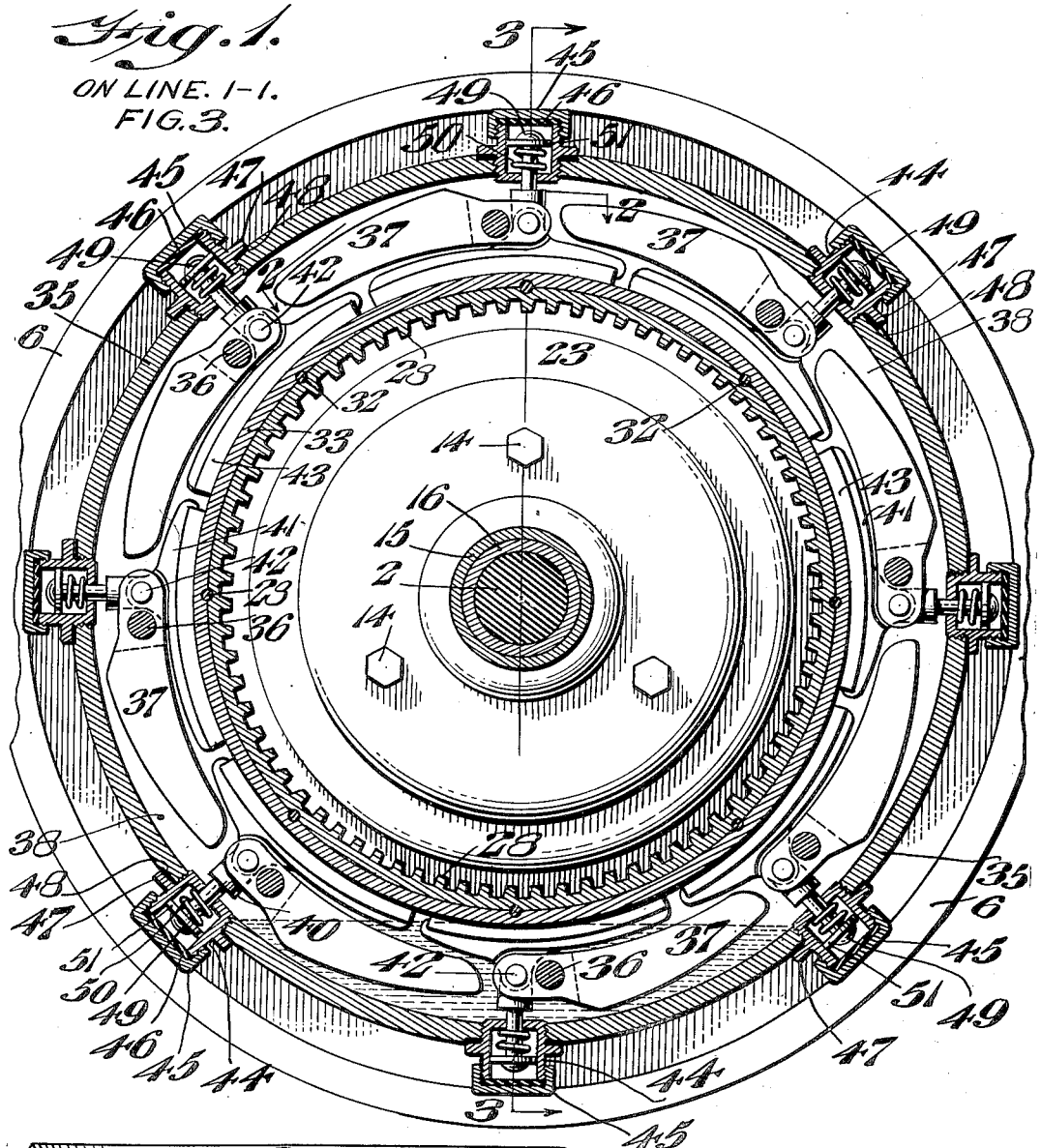
Fig.1.
ON LINE. 1-1.
FIG.3.
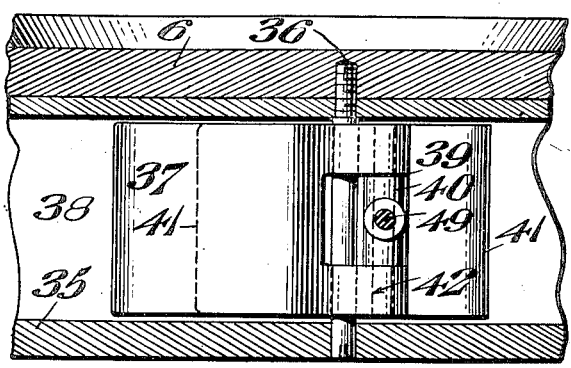
Fig.2.
ON LINE. 2-2. FIG.1.
Fisher H. Lippincott, INVENTOR
BY
ATTORNEYS

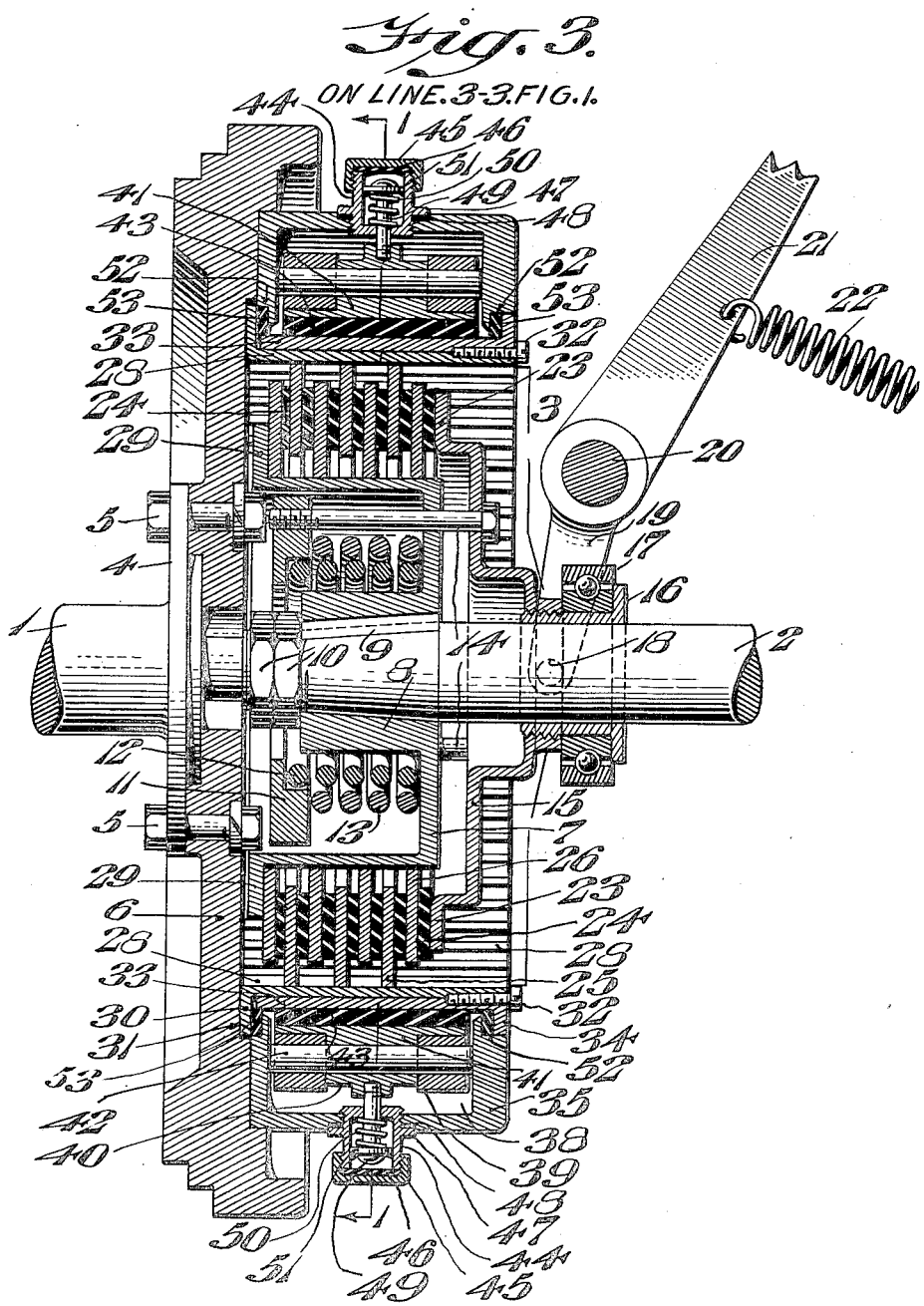

Patented Dec. 26, 1922.

1,440,161

UNITED STATES PATENT OFFICE.

FISHER H. LIPPINCOTT, OF PHILADELPHIA, PENNSYLVANIA, ASSIGNOR TO LIPPINCOTT-CARWEN CORPORATION, OF PHILADELPHIA, PENNSYLVANIA, A CORPORATION OF DELAWARE.

DRIVING MECHANISM.

Application filed August 1, 1921. Serial No. 488,805.

*To all whom it may concern:*

Be it known that I, FISHER H. LIPPINCOTT, a citizen of the United States, residing at Philadelphia, county of Philadelphia, State of Pennsylvania, have invented a new and useful Driving Mechanism, of which the following is a specification.

My present invention comprehends in its broad and generic scope a novel construction and arrangement of an automatic drive which is especially adapted to be employed in conjunction with vehicles of the motor driven type in order to provide an automatic control between the engine and the clutch or between the clutch and the transmission, whereby the high speed relation between the engine and the driven shaft can be maintained and the power and speed governed by engine throttling.

It further comprehends a novel construction of a centrifugally acting device which contributes to automatically form an operative connection between a driving and a driven member.

Other novel features of construction and advantage will hereinafter more fully appear in the detailed description.

For the purpose of illustrating my invention, I have shown in the accompanying drawings a typical embodiment of it which is at present preferred by me, since said embodiment has been found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a section on line 1—1 of Figure 3.

Figure 2 represents a section on line 2—2 of Figure 1.

Figure 3 represents a section on line 3—3 of Figure 1.

Similar numerals of reference indicate corresponding parts.

Referring to the drawings,

In a copending application Serial #452,269, I have described and generically claimed a novel construction and arrangement of an automatic speed driving mechanism wherein the driving engagement between the friction elements which form the operative connection between the driving and driven members is effected by laterally displacing the friction elements by means of centrifugally acting mechanism or, in other words, I utilize an automatic control of the friction elements of the clutch.

In accordance with my present invention, I employ centrifugally acting means to control the operative connection between the driving and driven members without rendering it necessary to automatically effect a lateral displacement of the friction elements of the clutch.

1 designates a driving member which may be the engine or driving shaft. 2 designates the driven member or driven shaft. 3 designates the clutch which may be of any desired or conventional type, and for purpose of illustration, I have shown a clutch of the multiple disc type. The driving member 1 is provided with a head 4 to which is connected, by means of fastening devices 5, a fly wheel 6. The clutch mechanism 3 is provided with an inner clutch drum 7 having its hub 8 secured to the driven member 2 by means of a key 9 and the nuts 10.

11 designates the follower ring between which and a wall of the clutch drum 7 is interposed the inner spring 12 and the outer spring 13. The follower ring 11 has connected to it the inner threaded ends of the bolts 14, which pass through the end wall of the inner clutch drum 7 and through a clutch disc 15, which is in threaded engagement with a collar 16 slidably mounted on the driven member 2, and provided with a ball race 17, so that a clutch collar is formed into the groove of which extends the clutch pins 18 of the clutch arms 19 mounted on a rock shaft 20 which also carries a clutch arm 21 under the control of an operator and provided with a spring 22, one end of which is connected to the arm 21 and the other end of which is connected to a fixed portion of the mechanism.

The clutch disc 15 forms a pressure transmitting disc and is provided at its outer periphery with the annular flange 23 which is in frictional engagement with the juxtaposed friction disc 24, a plurality of such discs 24 being employed, as seen in Figure 3. Certain of the friction discs 24 are interposed between the driving friction discs 25 and the driven friction discs 26, which latter are keyed to the inner clutch drum 7, while the friction discs 25 are intergeared with the internal gear 28. The inner clutch drum 7 is provided with the outwardly extending flange 29, against which bears one of the friction discs 26. The internal gear 28 is provided at one end with the outwardly extending annular flange 30 which is positioned within the recess 31 of the fly-wheel 6.

The internal gear 28 has secured to its outer periphery by means of fastening devices 32 the flanged sleeve 33 which is provided at its outer end with the outwardly extending flange 34. This sleeve 33 and the internal gear 28 form the outer clutch drum.

35 designates the casing element of the automatic controller which is fixedly secured to the fly-wheel 6 by means of the screws 36 which form pivot pins or fulcrum points for the centrifugally acting levers 37 which are contained within the chamber 38 of the casing element 35. The levers 37 are bifurcated at one end, as at 39, in order to receive the hubs 40 of the shoes 41 which are pivoted thereto by means of the pins 42. The shoes 41 are faced on their inner periphery with the friction elements 43 which co-operate with the outer periphery of the outer clutch drum. Each shoe 41 is acted upon by resilient means which tends to move its friction element 43 away from the periphery of the outer clutch drum. The controller casing 35 has in threaded engagement with it the clutch fittings 44, the outer ends of which are closed by means of threaded caps 45, and packing 46 is provided to prevent leakage between the caps and their fittings.

Each fitting is provided with a flange 47 between which and the casing 35 is interposed suitable packing 48. 49 designates a screw, the shank of which passes through the fitting and is connected with its respective hub 40 of a shoe 41, while its head is contained within the chamber of its fittings.

50 designates an adjusting spring interposed between the bottom wall of a fitting and a washer 51 which abuts against the head of the screw 49. The side walls of the casing element 35 are recessed, as at 52, in order to receive packing strips 53 so that a liquid seal is formed between the casing element 35 and the outer clutch drum, it being understood that in practice the chamber 38 of the casing element 35 is filled with a suitable lubricant.

The adjusting springs 50 are set in their adjusted position in such a manner that the shoes 41 will not take hold when the levers 37 are in their normal position. The springs 50 are of the proper strength to hold the levers 37 in their normal position at a predetermined engine speed, for example, they may be of such strength as to hold these levers in their normal position when the driving speed of the engine is about five miles per hour. The levers 37 are constructed and arranged in such a manner as to have a desired percentage more power at a given speed than the springs 50.

The operation of my novel automatic drive will now be readily apparent to those skilled in the art to which this invention appertains and is as follows:—

The automatic control or driving mechanism contributes to form the operative connection as illustrated between the driving member and the driven member or, in other words, between the driving shaft and the clutch or between the clutch and the transmission.

As the speed increases above the predetermined speed standard of the driving member, the levers 37 due to centrifugal action move outwardly, thereby causing the shoes 41 to move inwardly into a closer frictional engagement with the outer clutch drum. When the speed of the driving member decreases below the predetermined standard of speed the weighted ends of the levers 37 will move inwardly, thereby moving the shoes 41 outwardly and thus reducing the degree of friction between the driving and driven members.

While I have preferred to illustrate the springs 50 and their adjuncts, it will be apparent to those skilled in this art that if desired these springs and the fastening devices on which they are mounted and their adjuncts can be dispensed with and the levers so proportioned that the desired action can be obtained without the use of the springs 50 and I therefore do not desire to be limited to the employment of the springs 50.

It will be apparent that my novel automatic drive is independent of the clutch so that the clutch mechanism can be actuated whenever it may be deemed necessary by the operator by means of a foot or hand control of any desired or conventional construction.

My present invention, although not limited to such use, can be very advantageously employed in conjunction with vehicles of the motor driven type since it eliminates the necessity of changing gears when the motor vehicle slows down or stops or when it is started.

The friction driving elements are gradually brought into power transmitting engagement so that under conditions ordinarily arising in practice the motor vehicle can be run on high gear without changing to the intermediate or low gears, although the low or intermediate gears may be thrown into operation at the will of the operator.

It will be apparent that in accordance with my present invention the motor cannot be stalled by overloading since under such conditions its speed of revolution will decrease, and when it reaches the predetermined standard of speed at which the springs opposing the centrifugal action hold the friction elements out of action, the motor will be automatically disconnected from the driven member.

It will thus be apparent that when a motor vehicle is equipped with an automatic drive constructed in accordance with my present invention the strain of driving, especially when in congested traffic, is materially reduced, since the driver does not have to bother with the clutch or gear changing mechanism, and all that he has to do is to adjust the engine throttle so that a motor vehicle driven by an internal combustion engine can be controlled in substantially the same manner as is accomplished with an engine utilizing steam as a motive fluid.

In Figure 1 I have shown the lubricant within the chamber 38 so that the automatic control is properly lubricated under all conditions arising in practice.

It will now be apparent that I have devised a novel and useful construction of a driving mechanism which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent is:

1. In a driving mechanism, a driving member, a casing element operatively connected with said driving member to be driven by it, levers mounted in said casing element, a clutch having a drum forming with said casing element, an oil receiving chamber, friction members movably carried by said levers and co-operating with said drum, said levers due to centrifugal action moving said friction members towards said drum, and resilient means to move said friction members away from said drum.

2. In a driving mechanism, a driving member, a casing element operatively connected with said driving member to be driven by it, levers mounted in said casing element, a clutch having a drum forming with said casing element, an oil receiving chamber, friction members movably carried by said levers and co-operating with said drum, said levers due to centrifugal action moving said friction members towards said drum, and resilient means connected with said friction members and tending to move them away from said drum.

3. In a driving mechanism, a driving member, a casing element fixed to said member, centrifugally controlled levers pivoted to said casing element, friction shoes pivotally connected with said levers and moved inwardly thereby, a clutch drum with the outer periphery of which said friction shoes engage, and forming with said casing element an oil receiving chamber, resilient means tending to move said shoes outwardly, a driven member, and friction discs contributing to form an operative connection between said clutch and said driven member.

4. In a driving mechanism, a driving member, a casing element fixed to said member, centrifugally controlled levers pivoted to said casing element, friction shoes pivotally connected with said levers and moved inwardly thereby, a clutch drum with the outer periphery of which said friction shoes engage, and forming with said casing element an oil receiving chamber, resilient means tending to move said shoes outwardly and adjustable exteriorly of said casing element, a driven member, and friction discs contributing to form an operative connection between said clutch drum and said driven member.

5. In a driving mechanism, a driving member, a casing element fixed to said member, centrifugally controlled levers pivoted to said casing element, friction shoes pivotally connected with said levers and moved inwardly thereby, a clutch drum with the outer periphery of which said friction shoes engage, resilient means tending to move said shoes outwardly, a driven member, friction discs contributing to form an operative connection between said clutch drum and said driven member, and a casing mounted on the periphery of said casing element and inclosing said resilient means.

6. In a driving mechanism, a driving member, a casing element fixed to said member, centrifugally actuated levers pivotally mounted within said casing element, friction shoes movably connected with said levers, a clutch drum with the outer periphery of which said friction shoes engage, fittings carried by said casing element, headed members in said fittings and connected with their respective levers, springs between said fittings and the heads of said members, a driven member, and friction discs contributing to form an operative connection between said clutch drum and said driven member.

7. In a driving mechanism, a driving member, a casing element fixed to said member, centrifugally actuated levers pivotally mounted within said casing element, friction shoes movably connected with said levers, a clutch drum with the outer periphery of which said friction shoes engage, fittings carried by said casing element, headed members in said fittings and connected with their respective levers, springs between said fittings and the heads of said members, closures for the outer ends of said fittings whereby said springs can be adjusted exterior of the casing element without dismounting the parts, a driven member, and friction discs contributing to form an operative connection between said clutch drum and said driven member.

FISHER H. LIPPINCOTT.

Witnesses:
H. S. FAIRBANKS,
C. D. McVAY.